Sept. 7, 1937.  R. C. McCLAY  2,092,177
SOUND GATE
Filed July 5, 1935
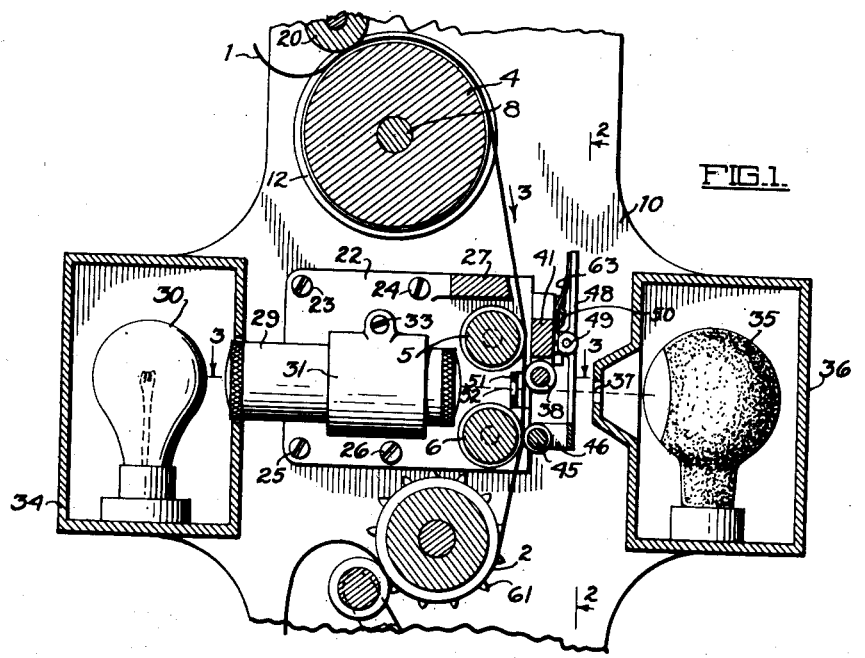
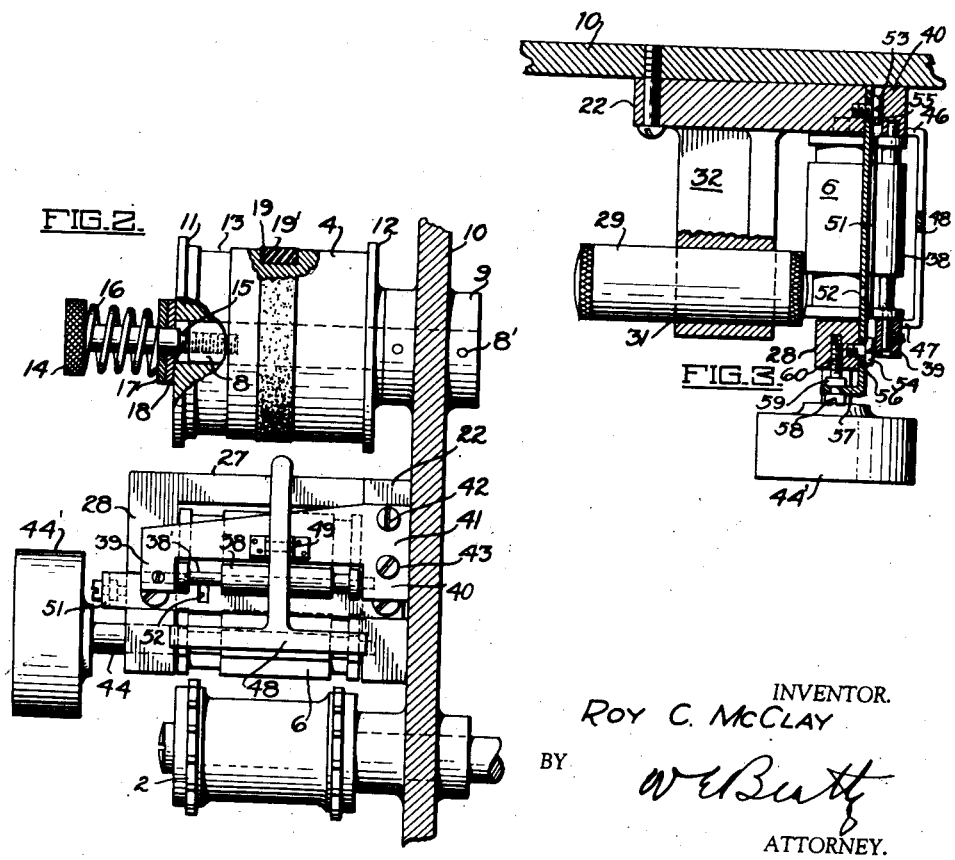
INVENTOR.
ROY C. McCLAY
BY W. E. Butt
ATTORNEY.

Patented Sept. 7, 1937

2,092,177

UNITED STATES PATENT OFFICE 2,092,177

SOUND GATE

Roy C. McClay, Los Angeles, Calif., assignor to United Research Corporation, Long Island City, N. Y., a corporation of Delaware Application July 5, 1935, Serial No. 29,927

10 Claims. (Cl. 179—100.3)

This invention relates to sound film apparatus of the type in which a film is passed at a uniform speed through a reproducer or recorder.

The present invention is particularly adaptable to sound reproducers in which the film is pulled over a pair of rollers, by a constantly rotating sprocket. Light from the exciter lamp is projected through a conventional optical system and slit and focused on the film at a point midway between the two rollers. As the sound record of the film intercepts the light beam projected from the exciter lamp it changes the beam into light impulses of varying density and frequency. These light impulses are converted into electrical energy by means of a suitable photoelectric cell.

Due to the fact that the narrow beam of light has to be sharply focused on the film, any movement of the film to and from the optical system, even though a matter of a few thousandths of an inch, may be sufficient to throw the beam of light out of focus and thereby impair the quality of the sound reproduced.

I have found that the film on passing at the required speed over the two rollers adjacent the point of sound translation has a tendency to flutter to and from the optical system and thus cause distortion in the sound reproduced. An object of the present invention is to overcome this defect.

Another object of my invention is to keep the film in a straight line as it passes the point of sound translation.

Both of the above objects are accomplished by providing a third roller placed on the side of the film opposite from the pair of rollers above mentioned, and closely adjacent the optical axis of the beam of light from the exciter lamp. This roller stiffens the film to prevent fluttering and also makes it pass in a straight line when intercepting the beam of light.

Another object of my invention is to eliminate the need of adjustment of the optical system in respect to the film each time the sound gate is removed. This is accomplished by providing a unitary structure whereby the lens barrel holder and the sound gate may be removed as a whole for cleaning or replacement without requiring adjustment when replaced.

A further object of the invention is to prevent small variations in speed from being transmitted along the film to the point of sound translation.

This is accomplished by providing a drag roller, driven by the film at a point adjacent the sound gate, the drag roller being provided with a resilient rubber surface to absorb the variations in speed.

More particularly describing the invention, reference may be had to the accompanying illustrations wherein:

Fig. 1 is a sectional elevation view of part of a sound reproducer employing my improved sound gate.

Fig. 2 is a sectional elevation view taken along the line 2—2 of Fig. 1.

Fig. 3 is a plan sectional view taken along the line 3—3 of Fig. 1.

Referring to Figs. 1 and 2, the film 1 having a sound track thereon is pulled by means of continuously running sprocket 2 in a direction of the arrow 3. The film 1 passes over a drag roller 4 and thence over a pair of rollers 5 and 6 comprising part of the sound gate, the emulsion side of the film being adjacent the exciter lamp. The drag roller 4 is journaled upon a stud 8 which is secured within a boss 9 provided on a wall 10 of the sound reproducer, by means of pins 8'. A pair of edge guiding flanges 11 and 12 are provided on either end of the drag roller 4. A groove 13 is also provided near one end to allow the sound track portion of the film to pass thereover without scratching the surface. In order to provide a predetermined amount of drag or resistance to the drag roller 4, a knurled screw 14 is provided having a threaded end portion 15 which is threadably mounted within the end of the stud 8. The head of the screw 14 engages a compression spring 16 which in turn applies pressure to a pair of thrust washers 17 and 18. Thus it will be seen that by rotating the screw, any desired amount of resistance of the drag roller 4 may be obtained to keep the film 1 taut as it passes the sound gate. A circumferential groove 19 is provided in the central portion of the roller 4 and receives an annular soft rubber ring 19'. The periphery of the ring 19' extends slightly above the surface of the roller 4 to maintain contact with the film 1 and thus assist a spring pressed roller 20 in preventing slippage between the film and the roller 4. The ring 19', because of its adhesive property also keeps the film in a straight line instead of permitting it to tend to travel back and forth sideways between the two guide flanges 11 and 12 while running through the sound gate. Due to the resiliency of the rubber ring 19', the drag roller 4 also assists in preventing small variations in speed due to sprocket ripple, etc., from being transmitted along the film to the point of sound translation by absorbing these speed variations within the rubber of the ring 19'.

Referring now to Figs. 1 and 3, it will be noted that the sound gate is mounted upon a unitary casting or bracket 22 which is secured to the wall or structure 10 of the reproducer by screws 23, 24, 25, and 26. The forward part of the casting 22 is provided with an outwardly extending arm 27 having a downwardly projecting leg 28 at its outer end. The leg 28 serves as an outer bearing for the rollers 5 and 6. To the rear of the rollers 5 and 6 and midway between their centers is mounted a lens barrel 29 containing the conventional slit assembly and lenses for focusing light from an exciter lamp 30 onto the film in the form of a horizontally disposed slit of light. The lens barrel 29 is located in a split sleeve 31 formed on the end of a projection 32 which is integral with the casting 22. A screw 33 is provided to clamp the lens barrel in any desired position. By providing the sound gate and lens holder on a unitary structure the casting 22 may be removed for the purpose of cleaning or replacement without requiring the delicate adjustment of the lens barrel 29 when replacing.

The exciter lamp 30 is provided within a lightproof housing 34 which is secured to the wall 10. A photo-electric cell 35 is provided within a lightproof housing 36 secured to the wall 10 on the opposite side of the film 1. An aperture 37 allows modulated light produced by the sound track of the film moving across the beam of light to fall upon the photo-electric cell 35.

A third roller 38 is provided intermediate the rollers 5 and 6 but on the opposite side of the film to stiffen it. If the roller 38 were not used, the film, due to its speed and resilience, would tend to travel in an arcuate path between the two rollers 5 and 6. Also due to the length of unsupported film between the two rollers 5 and 6, the film would have a tendency to fluctuate or flutter to and from the lens barrel 29 and thus prevent the light beam from being sharply focused upon it. The roller 38 is journaled in downwardly projecting legs 39 and 40 of a U-shaped member 41. The member 41 is secured to the front edge of the casting 22 by means of screws 42 and 43. That portion of the rollers 38 which is adjacent the sound track portion of the film is undercut as at 38' so as to allow the roller 38 to be placed as close as possible to the axis of the projected light beam. This also prevents the sound track portion of the film from being scratched.

The roller 6 has a shaft 44 secured thereto which extends through the leg 28 and has a flywheel 44' attached to its outer end. A roller 45 adjacent the flywheel roller 6 is adapted to press the film against the roller 6 and thus drive the flywheel 44. The roller 45 is journaled in the ends of a pair of projections 46 and 47 provided on the lower end of a T-shaped lever 48 which is pivotally mounted at 49 to the member 41. A leaf spring 63 is secured at its lower end to the member 41 by a screw 50 and its upper end engages the upper end of the lever 48 to press the roller 45 against the roller 6. The flywheel 44', due to its inertia, prevents any small variations in speed due to sprocket ripples or backlast of the sprocket gears from being transmitted along the film 1 past the roller 6 and to the point of sound translation.

A mask 51 is provided intermediate the rollers 5 and 6 and has a rectangular aperture 52 provided therein at a point adjacent the sound track portion of the film 1. Thus only a desired portion of the sound track may be utilized to bring out the best quality of sound. The mask 51 is secured in place by means of a pair of set screws 53 and 54 which are passed through elongated slots 55 and 56 in the mask 51 and are threadedly secured within the casting 22 and the leg 28. The outer end of the mask 51 is bent at right angles as at 57 (Fig. 3) and has an aperture therein adapted to be engaged between a head 58 and a collar 59 of a screw 60 which is threadedly mounted within the leg 28. By loosening the set screws 53 and 54 the screw 60 may be rotated to effect lateral adjustment of the mask 51.

The film 1 is edge-guided above the sound gate by means of the guide flanges 11 and 12 provided on the ends of the drag roller 4 and below the sound gate by means of the teeth 61 of the sound sprocket 2.

Having thus described the invention, what is claimed as new and desired to secure by Letters Patent, is:

1. In a sound film apparatus, the combination of a pair of film supports adapted to engage one side of a sound film, means for driving said sound film over said supports, means for focusing a beam of light on said film at a point intermediate said supports, and means intermediate said supports for engaging the opposite side of said film, said pair of film supports and said intermediate means forming a three-point support for said film, the contacting portion of said means lying substantially in a plane tangent to the same sides of said supports for guiding said film substantially in said plane.

2. In a sound film apparatus according to claim 1 wherein the means for engaging the opposite side of the film includes a roller.

3. In a sound film apparatus, the combination of a pair of rollers adapted to support a sound film, means for driving said film over said rollers, means for focusing a beam of light on said film at a point intermediate said rollers, and a third roller intermediate said pair of rollers for engaging the side of said film opposite the side engaged by said pair of rollers, said pair of rollers and said third roller forming a three-point support for said film, said third roller having a circumferential groove thereon adjacent the sound track portion of said film to allow said third roller to straddle said beam of light, the film contact portion of said third roller lying substantially in a plane tangent to the same sides of said pair of rollers for guiding said film substantially in said plane.

4. In a sound film apparatus, the combination of a pair of sound film supporting rollers, means for focusing light upon said film, a third roller intermediate said pair of rollers and adapted to engage said film on the opposite side thereof, all of said rollers forming a three-point support for said film, said film lying substantially in a plane formed by said three points, a flywheel attached to one of said pair of film supporting rollers to prevent small variations in speed from being transmitted along the film to the point of sound translation, and a spring pressed roller for pressing the film into engagement with said flywheel roller.

5. In a sound film apparatus the combination of a film gate for supporting a film at three points lying substantially in the same plane, means for traversing film through said film gate, and a drag roller adapted to engage said film, said drag roller having a narrow raised resilient rubber surface in the center thereof to grip said film, to direct said film and to absorb variations of speed therein.

6. In a sound film apparatus, the combination of a pair of rollers having their axes lying in a common plane, means for driving a film over said rollers, the axis of said means being displaced at one side of said axis plane of said rollers, a tensioning means engaging said film before engagement with said rollers and on the same side of the plane of said rollers as said driving means, and means intermediate said rollers for maintaining said film substantially in a plane, said means and pair of rollers forming a three-point support for said film, said means permitting a light beam to be projected through said film at substantially the point of contact of said last mentioned means with said film.

7. A film drive apparatus in accordance with claim 6 in which the one of said first mentioned rollers adjacent said driving means is connected to a flywheel and is adapted to have film pressed thereon by a spring pressed roller.

8. A film drive apparatus in accordance with claim 6 in which said last mentioned means comprises a roller having an undercut portion corresponding to the position of the sound track portion of the film on the roller.

9. A film gate for maintaining a sound film substantially in a plane over a considerable length thereof at the point of contact of a beam of light with said film comprising a pair of spaced rollers contacting the film on one side thereof and a third roller positioned intermediate said first two rollers for contacting the film on the opposite side thereof, the film passing between said pair of rollers and lying substantially in a plane having a thickness comparable to the film thickness and contacting the contact portion of said third roller and points on said pair of rollers tangential to said rollers on the film contact side of said rollers.

10. A film gate in accordance with claim 9 in which said third roller is positioned to one side of the center point between said rollers.

ROY C. McCLAY.